May 9, 1967     I. C. KLIMASZEWSKI     3,318,688
PROCESS OF PRODUCING ZIRCONIUM METAL
Filed Feb. 13, 1962
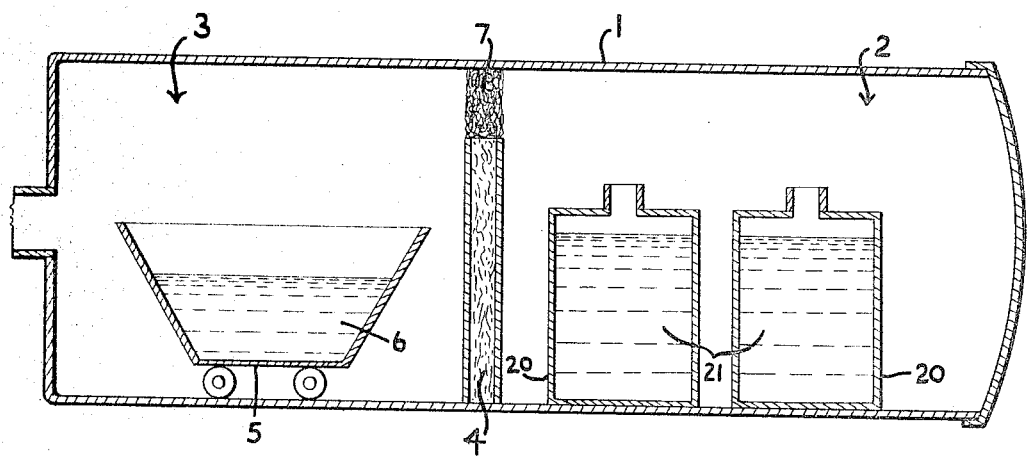
INVENTOR.
IRVIN C. KLIMASZEWSKI
BY
Chisholm and Spencer
ATTORNEYS

3,318,688
PROCESS OF PRODUCING ZIRCONIUM METAL
Irvin C. Klimaszewski, Pensacola, Fla., assignor, by mesne assignments, to Pittsburgh Plate Glass Company
Filed Feb. 13, 1962, Ser. No. 172,932
1 Claim. (Cl. 75—84.5)

This invention concerns the manufacture of zirconium. It especially relates to the reduction with magnesium or other reducing agent of zirconium halide to zirconium.

One method by which zirconium is produced involves subliming zirconium tetrachloride and reacting at suitable temperature the resulting vapors with molten alkaline metal (alkaline earth or alkali metal), notably molten magnesium or sodium. With magnesium, suitable reducing temperatures are 650° C. or higher. In typical performance of such method solid zirconium tetrachloride is heated to above 331° C. (its sublimation temperature). The resulting vapors of zirconium tetrachloride are passed into contact with molten magnesium at 650° C. to 900° C. Reaction between the magnesium and zirconium tetrachloride occurs forming zirconium and magnesinum chloride. Magnesium chloride is separated, usually by vacuum distillation, to obtain zirconium.

Performance of such method is accomplished using a horizontal retort divided by a common vertical wall into a pair of zones, the respective temperatures of which are independently controllable. In one zone, the temperature is such that zirconium tetrachloride vapors are generated by subliming solid. Zirconium is formed in the other zone (reducing zone) by passing these vapors thereinto through a port and contacting molten magnesium maintained at reducing temperature.

In manufacturing zirconium by such reduction of zirconium tetrachloride, certain undesirable conditions are encountered. It is found, for example, substantial amounts of fine particles, probably zirconium dust, accumulate in the vaporization zone. Upon exposure to an oxidation sustaining atmosphere (atmospheric air), these particles tend to ignite. Moreover, upon opening the vaporization zone, a dense smoke is encountered. These conditions are detrimental and hazardous.

According to this invention, it has now been discovered that these undesirable features may be minimized substantially and even eliminated for all practical purposes by filling the port or other opening through which tetrachloride vapors enter the reduction zone with a gas permeable inert material such as steel wool. Thus, pursuant hereto zirconium tetrachloride vapors are generated by sublimation in a vaporization zone thermally insulated from a reduction zone and introduced into the reduction zone (and ultimately into contact with molten reducing metal) through a gas permeable inert material. This gas permeable inert material, in a preferred embodiment, fills substantially all of the means by which the vaporization zone is in gaseous communication with the reduction zone.

A typical apparatus useful in performing the contemplated method is illustrated in the drawing.

Suitable apparatus comprises cylindrical retort 1 which, in the production of zirconium, is disposed horizontally in a furnace so constructed that different temperatures are established and maintained in zones 2 and 3 of the retort. Retort 1 is partitioned into vaporization zone 2 and reduction zone 3 by wall (or thermal barrier) 4, usually constructed with insulating material encased in a metal shield. This thermal barrier separates thermally as well as physically zone 2, thus minimizing heat transfer from zone 3 to zone 2 and facilitating maintenance of their respective temperatures.

In vaporization zone 2 are cans 20, each of which initially is charged with solid zirconium tetrachloride 21. Boat 5 in reduction zone 3 is filled with metallic magnesium 6, e.g., magnesium ingots, or like reducing metal. After suitable preconditioning of the zones, zone 2 is brought to a temperature at which zirconium tetrachloride vapors are generated, rarely lower than 331° C. and usually about 400° C. to 500° C. Zone 3 is heated to a temperature of 650° C. or more, usually between 800° C. and 900° C. Magnesium in boat 5 becomes molten.

As a result, zirconium tetrachloride vapors evolve from containers 20 and through communicating port 7 pass into reduction zone 3 ultimately to contact and react with molten magnesium in boat 5. Port 7 is packed with steel wool in accordance with this invention. Other gas communication means between the zones, when present, are also packed with steel wool.

Pursuant to a preferred embodiment, the gas permeable material is disposed in substantially the same principle plane (usually a vertical plane) of insulated barrier 4. Good practices usually dictate that the gas communication means between the zones be kept at a minimum. With a retort of the type schematically illustrated in the drawing, opening 7 represents no more than 10 percent, and usually less than 5 percent, of the area of insulating wall 4. Hence, the area (measured perpendicular to the movement of gases) of inert gas permeable material is correspondingly small.

It is particularly beneficial that the vapors of zirconium tetrachloride flow upwardly from the body of zirconium tetrachloride from which they are evolved in their passage into the reduction zone 3. The body of reducing metal, notably molten magnesium, should, and in a preferred embodiment, be disposed at a level in the reducing zone which is below the ingress of zirconium tetrahalide vapors.

The physical character of the inert gas permeable barrier is such that it is sufficiently porous to permit ready passable therethrough of zirconium tetrachloride vapors. It may be viewed as mesh like, and one especially suitable material is "steel wool" of the type sold commercially for household use. Mesh thicknesses measured parallel to the line of zirconium tetrachloride vapor flow is 2 inches or more, frequently 4 to 12 inches.

Chemically, the mesh or gas permeable material is substantially inert with respect to zirconium tetrachloride under the prevailing conditions, thus insuring that it is not responsible for contaminating the zirconium.

In a typical performance of the present invention, a retort is charged first with one or more containers of solid zirconium tetrachloride, following which the insulating barrier wall is inserted and the passage for zirconium tetrachloride vapors packed with steel wool. A boat of magnesium or like alkali metal reducing metal is placed in the retort in a zone thermally insulated by the barrier wall from the zone containing zirconium tetrachloride. Thereafter, the whole retort is gradually heated to a few hundred degrees centigrade, while being evacuated, to drive off volatile impurities such as absorbed water and air. Once this is accomplished, a pressure slightly in excess of atmospheric is established in the reducing and volatilization zones by introducing argon. Heat is then applied to the reduction zone to gradually bring it to about 850° C.

Magnesium originally present in the boat as solids, e.g., ingots, is rendered molten to provide in the reducing zone a molten pool of metallic magnesium. Heating of the vaporization zone is then commenced and the temperature therein is gradually raised to at least 331° C., more normally about 330° C. to 350° C., whereupon the volatilization of zirconium tetrachloride commences.

Zirconium tetrachloride vapors migrate from the vaporization zone through the steel wool mesh into the reduction zone wherein they react with molten magnesium to form the zirconium metal and magnesium chloride. This is continued until substantially all of the zirconium tetrachloride has been volatilized.

Ultimately, the retort is opened to remove the boat which contains product zirconium and by-product magnesium chloride. Magnesium chloride may be removed from the zirconium, by vacuum distillation, to recover high purity zirconium metal.

It is found in the production of zirconium according to such procedure that the presence of the steel wool barrier minimizes strikingly the amount of fine dust particles, presumably of zirconium, present in the vaporization zone. Moreover, the dense smoke encountered upon opening the retort is substantially eliminated.

The following example illustrates the manner in which the present invention may be practiced:

EXAMPLE I

A boat containing 1800 pounds of magnesium ingots was placed in the end of a cylindrical retort 5 feet in diameter and 23 feet long. A pair of zirconium tetrachloride containers each having 3500 pounds of zirconium tetrachloride therein were placed in the other end of the retort. The zirconium tetrachloride containers and magnesium boat were separated in the retort by a thermal barrier wall extending from the bottom of the retort to within 6 inches of the top. The gas communication space between the respective areas of the retort (separated by the thermally insulating wall) was approximately 3 square feet in cross section. This area was filled with approximately 3½ pounds of 430 stainless steel wool.

Thereafter, the whole retort was gradually heated to 315° C., while evacuated, to drive off volatile impurities. Then the retort pressure was brought to about 17 pounds per square inch absolute by introducing argon. The temperature in the reduction zone was raised to 850° C., thereby melting the magnesium ingots in the boat and providing a molten pool of magnesium metal. In the vaporization zone, the temperature was raised to 350° C., whereupon volatilization of the zirconium tetrachloride was effected and with the temperature so maintained, the formation of zirconium metal commenced as the vapors of zirconium tetrachloride passed through the steel wool and into contact with the molten magensium metal. A high yield of quality zirconium sponge ultimately was obtained in this manner. Upon opening of the retort, after completing the reduction, little dust was present in the vaporization and little smoke was encountered.

EXAMPLE II

The foregoing example was essentially duplicated except that no steel wool or other solid material was in the space providing communication between the volatilization and reducing zones. Unlike the results obtained in Example I, upon opening the retort at the end of the run, a dense cloud of smoke was encountered and a considerable quantity of dust was present in the vaporization zone.

Besides metallic magnesium, it is to be appreciated that other alkali metal and alkaline earth metals are also effective in reducing zirconium tetrachloride vapors to zirconium metal and hence are useful in connection with the performance of the present invention. Among such metals, there may be mentioned sodium, calcium, potassium, barium and aluminum.

Moreover, while zirconium tetrachloride is the more preferred tetrahalide, other zirconium halides are of use.

While the invention has been described with respect to certain details of specific embodiments, it is not intended that the invention be construed as limited to such details except insofar as they are set forth in the appended claim:

I claim:

In the method of producing zirconium metal by reduction of zirconium tetrachloride with an alkaline reducing metal wherein solid zirconium tetrachloride is sublimed in a vaporization zone and the vapors are forwarded to a reducing zone containing the alkaline reducing metal maintained at reducing temperature, the improvement which comprises forwarding the vaporized zirconium tetrachloride from the vaporization zone to the reduction zone through a passage filled with inert gas permeable material in a thermal barrier common to both zones to discharge the zirconium tetrachloride vapors after passage through the gas permeable material directly into the reduction zone whereby to reduce the amount of fine dust particles present in the vaporization zone.

References Cited by the Examiner

UNITED STATES PATENTS

| 905,753 | 12/1908 | Shortman | 75—88 |
| 1,085,712 | 2/1914 | Vadner | 266—15 |
| 1,873,573 | 8/1932 | Galvin | 55—492 |
| 2,246,386 | 6/1941 | Schneider | 75—84.5 |
| 2,608,472 | 8/1952 | Flosdorf et al. | 266—15 X |
| 3,013,877 | 12/1961 | Hnilicka | 75—84.5 |
| 3,078,082 | 2/1963 | Hnilicka | 75—84.5 |

FOREIGN PATENTS

| 489,090 | 12/1952 | Canada. |
| 628,147 | 8/1949 | Great Britain. |

HYLAND BIZOT, *Primary Examiner.*

DAVID L. RECK, WINSTON A. DOUGLAS,
*Examiners.*

N. F. MARKVA, H. W. TARRING,
*Assistant Examiners.*